United States Patent [19]

Solo

[11] Patent Number: 4,801,790
[45] Date of Patent: Jan. 31, 1989

[54] ACCESS CARD PROVIDED WITH CODED SECURITY MEANS

[75] Inventor: Alan J. Solo, Brooklyn, N.Y.

[73] Assignee: Valid Technologies, Ltd., New York, N.Y.

[21] Appl. No.: 2,511

[22] Filed: Jan. 12, 1987

[51] Int. Cl.[4] ............................................. G06K 5/00
[52] U.S. Cl. .................................. 235/487; 235/490; 235/448; 235/380
[58] Field of Search .............. 235/435, 445, 380, 487, 235/490, 403, 445, 441, 382, 453

[56] References Cited

U.S. PATENT DOCUMENTS

| | | | |
|---|---|---|---|
| 2,967,916 | 1/1961 | Williams | 235/448 X |
| 3,463,890 | 8/1969 | Schinner et al. | 235/448 X |
| 3,526,755 | 9/1970 | Campbell et al. | 235/435 |
| 3,530,280 | 9/1970 | Goldman | 235/380 |
| 3,581,063 | 5/1971 | Levasseur | 235/435 |
| 3,632,991 | 1/1972 | Brinning | 235/435 |
| 3,643,065 | 2/1972 | Dunigan | 235/435 X |
| 3,772,501 | 11/1973 | Guthrie et al. | 235/435 |
| 3,868,057 | 2/1975 | Chavez | 235/380 |
| 4,097,068 | 6/1978 | Garnier, Sr. | 235/490 X |
| 4,297,568 | 10/1981 | Okatsuka | 235/435 |
| 4,562,342 | 12/1985 | Solo | 235/435 X |

Primary Examiner—M. H. Paschall
Assistant Examiner—A. Jonathan Wysocki
Attorney, Agent, or Firm—Goodman & Teitelbaum

[57] ABSTRACT

An access card having a card body including a plurality of hinged tab members which can be pivoted between a first position in a first plane and a second position in a second plane so that the selected pivoted ones of the tab members in the second position provide a particular coded information for checking the authenticity of a user of the access card. The tab members are arranged in a side-by-side position with a partition member disposed between adjacent tab members. Abutment members are provided on opposite sides of each tab member, and abutment portions are provided on opposite sides of each partition member for engagement with the tab abutment members to maintain the selected tab members in the depressed second position. Preferably, the tab members and partition members are parts of an insert member which is secured to the card body.

24 Claims, 4 Drawing Sheets

ACCESS CARD PROVIDED WITH CODED SECURITY MEANS

BACKGROUND OF THE INVENTION

This invention relates to access cards, such as credit cards and key cards, and more particularly to credit and key cards having tab members to provide coded information which are activated by the user to avoid unauthorized use of the access card.

The use of access cards of the key card type are well known in the art. U.S. Pat. No. 4,012,583 discloses a key card having a magnetizable area thereon in order to activate a TV receiver for viewing. U.S. Pat. No. 3,761,683 discloses a key card having an optical track and a magnetic track thereon for activating a reader device of a security system. Furthermore, key cards are used in a security system to gain access to a particular room or security area, such as a hotel room as disclosed in U.S. Pat. No. 3,694,810 which discloses a key card having a series of holes therethrough, U.S. Pat. No. 3,742,453 disclosing a key card having magnetic information retaining areas thereon, U.S. Pat. No. 3,781,805 disclosing a key card having notches and a series of punched holes therein, and U.S. Pat. No. 3,906,447 disclosing a key card having a series of holes therein.

However, the coded information on the above mentioned key cards is set for each particular key card, so that if the key card is lost or finds its way into unauthorized hands, the unauthorized person can use any of the above mentioned key cards to gain access to the security device, room or area, where there is no way of preventing such unauthorized use once the unauthorized user has a key card or a copy thereof.

In my U.S. Pat. No. 4,562,342, I disclosed a credit card having a foldable tab at each corner of the credit card to provide a different code associated therewith by folding down selected ones of the corner tabs to thus provide an additional encoded information for determining the authenticity of the individual when presenting the credit card to a vendor, where the credit card itself was one of those commonly used by banks or credit companies which have become common place among purchasers. Accordingly, the use of the fold down corner tabs prevented unauthorized use of the card by unauthorized users when the credit card was lost, stolen or copied, such as when the information on the credit card was obtained from the discarded carbon paper of the sales slip.

However, due to the fact that the coded information of my patented credit card was obtained from the four bent down corner tabs, the number of different coded information was limited. Furthermore, my patented credit card did not provide any means for maintaining the corner tabs in their bent down positions, and therefore the proper coded information could accidentally be changed when one of the bent down corner tabs was inadvertently bent back up to its original position. Accordingly, there is a need for improving my patented credit card to permit a greater number of different combinations, and also to provide means for maintaining the tabs in their folded or depressed position or positions.

SUMMARY OF THE INVENTION

It is accordingly an object of the present invention to provide an access card which avoids the aforementioned problems of the prior art credit and key cards Another object of the present invention is to provide an access card with coded information which can be set into a card by the user of the card.

A further object of the present invention is to provide an access card which can be used to verify the authenticity of the card user.

Still another object of the present invention is to provide an access card which can be used to detect whether or not the individual presenting the card is or is not authorized for such use.

A further object of the present invention is to provide an access card which will prevent the use of counterfeit cards.

Another object of the present invention is to provide an access card having tab members thereon which can be selectively depressed to provide a particular coded information for checking the authenticity of the user of the card.

Briefly, in accordance with the present invention, there is provided an access card, such as a credit card or a key card, having a card body including a plurality of hinged tabs which can be pivoted between a first position in a first plane and a second position in a second plane so that the selected pivoted ones of the tab members in the second position provide a particular coded information for checking the authenticity of a user of the access card. The tab members are arranged in a side-by-side position with a partition member disposed between adjacent tab members. Abutment members are provided on opposite sides of each tab member, and abutment portions are provided on each side of the partition members for engagement with the tab abutment members to maintain the selected tab members in the depressed second position.

In addition, the access card can contain the usual coded information identifying the type of card, the name of the card owner, and the identification number of the card owner.

Preferably, the tab members and partition members are parts of an insert member which is secured to the card body. Additionally, the partition members can be in the same plane as the non-depressed tab members, or the partition members can be inclined so that the abutment portions of the partition members are spaced below the tab abutment members of the non-depressed tab members. Furthermore, the abutment members of the tab members can be positioned either closer to the hinge of each tab, or closer to the free end of each tab member, where the abutment portions of the partition members would be relocated for alignment with the tab abutment members.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which.

In the various figures of the drawings like reference characters designate like parts.

DESCRIPTION OF THE PREFERRED EMBODIMENTS

Figure 1:
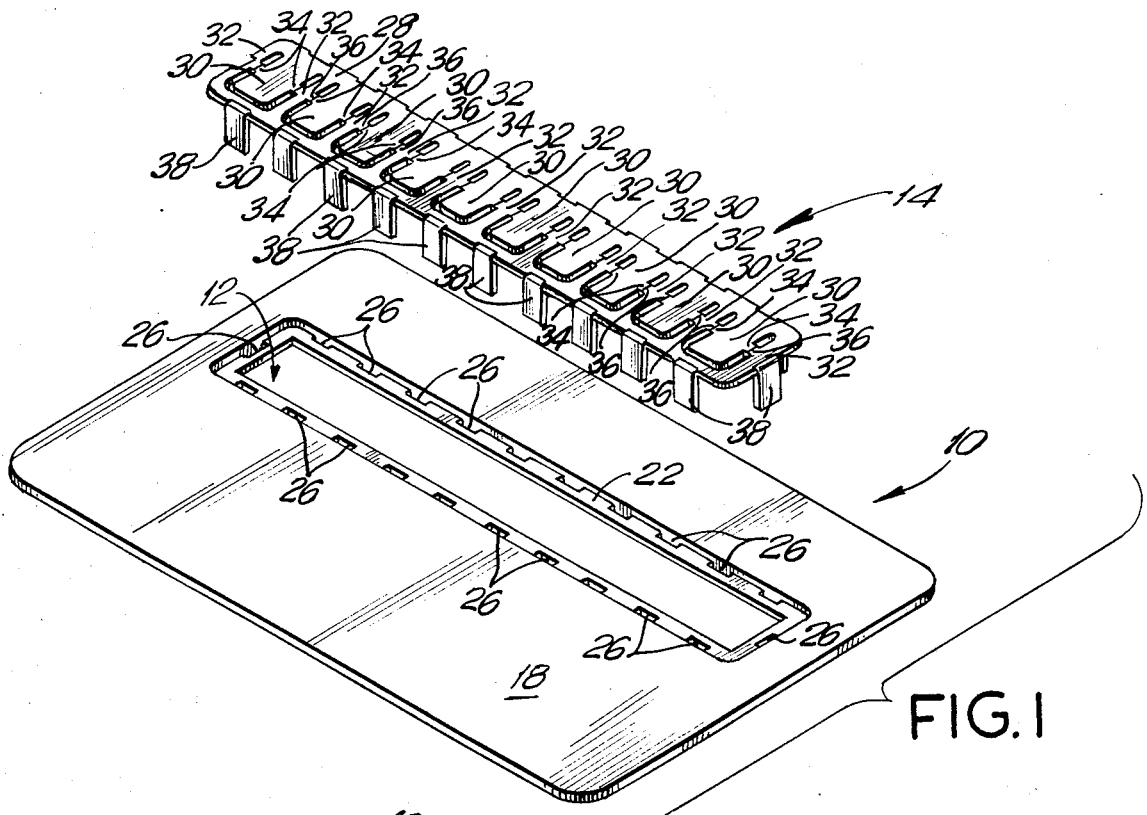
FIG. 1 is an exploded perspective view of an access card in accordance with the present invention, showing insert tab means and a card having an opening therethrough for receiving the insert tab means.
Figure 2:
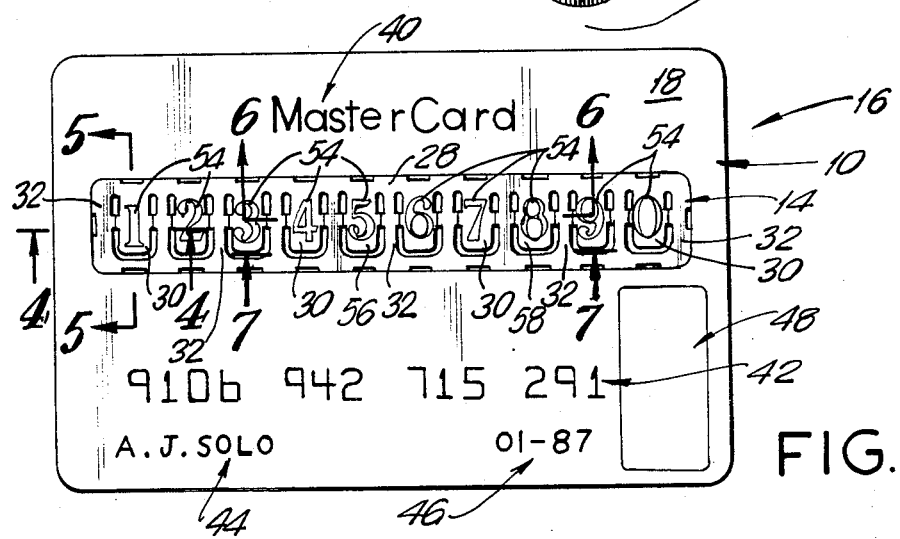
FIG. 2 is a front view of the assembled access card.
Figure 3:
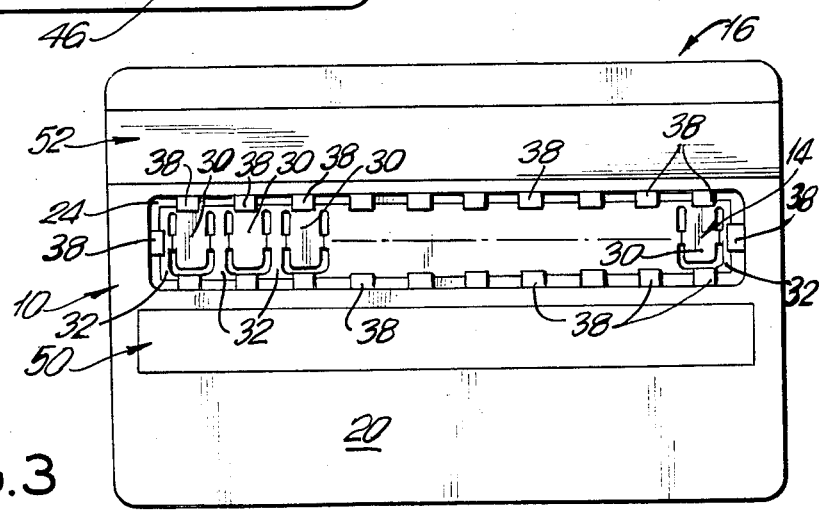
FIG. 3 is a rear view of the access card.
Figure 4:
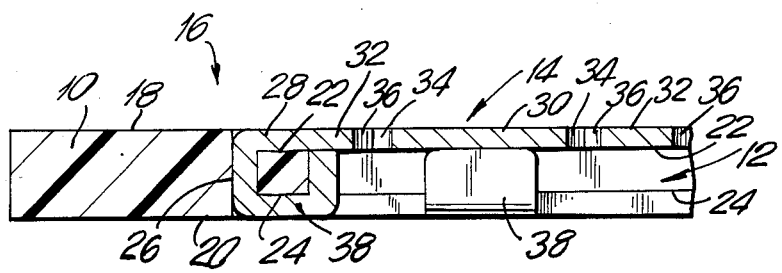
FIG. 4 is a fragmented cross sectional view taken substantially along line 4—4 of FIG. 2.
Figure 5:
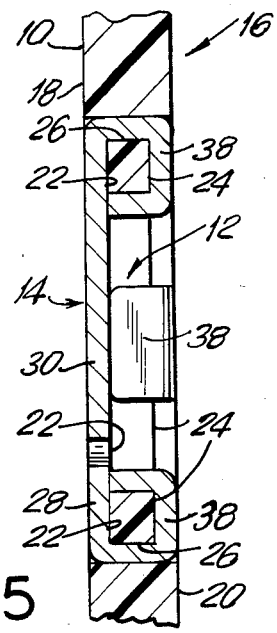
FIG. 5 is a fragmented cross sectional view taken substantially along line 5—5 of FIG. 2.

Referring now to the drawings, FIG. 1 shows a card 10 having an opening 12 therethrough for receiving insert tab means 14 in order to form an access card 16, the front 18 of which is shown in FIG. 2 with the back 20 thereof being shown in FIG. 3. The card 10 has a substantially rectangular body generally formed of plastic material, with the insert tab means 14 preferably being fabricated from sheet metal material. A recessed seat 22 is formed around the opening 12 on the front 18 of the card 10, with a further recessed seat 24 being formed around the opening 12 on the back 20 of the card. A plurality of openings 26 are arranged around the opening 12 and extend through the recessed seat 22 to the recessed seat 24, as best shown in FIGS. 1, 4 and 5, the function of which is set forth below.

Figure 8:
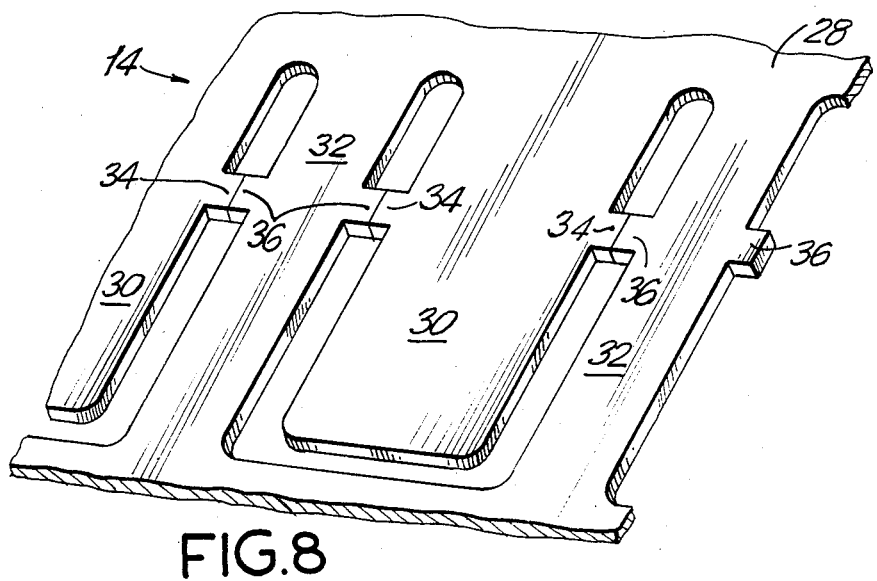
FIG. 8 is an enlarged fragmented perspective view showing the relationship between the tab members and partition members of the insert tab means.

The insert tab means 14 includes a substantially rectangular frame member 28 having a plurality of tab members 30 hinged thereto along one side, there preferably being ten tab members 30 though obviously this member can vary according to requirements. The tab members 30 are preferably arranged in a side-by-side relationship with stationary partition members 32 disposed therebetween. Abutment members 34 are disposed on oppsite sides of each tab member 30 for coaction with abutment portions 36 disposed on opposite sides of the partition members 32, where the tab abutment members 34 and the partition abutment portions 36 are in alignment with each other, and normally are disposed in the same plane as best shown in FIG. 8, the function of which will be set forth below. Additionally, a plurality of lug members 38 extend perpendicularly from the periphery about the frame member 28, the function of which will also be set forth below.

Referring to FIG. 2, information 40 is provided on the front 18 of the access card 16, where this information 40 identifies the particular type of access card, such as a credit card, key card, or the like. The access card 16 shown in FIG. 1, 2, and 3 is of the credit card type, where the information 40 includes the name of the card company or the name of the particular bank issuing the card, where the credit card could also have particular colors and/or color scheme arrangements which would uniquely identify the card as a particular type of credit card. The information 40 is normally printed directly onto the card It is noted, that if the access card 16 were used as a key card, the information 40 would include the particular hotel, station, or device which is to be protected by the use of the key card.

Additionally, the front 18 of the access card 16 includes specific information relating to the particular card owner, such as the particular credit card identification number 42 which is raised above the surface of the front 18, and also the name 44 of the owner of the card, as well as an expiration date 46. Additionally, many credit cards now include a hologram 48 to make it difficult for a nonauthorized person to copy the credit card. It is understood, that if the access card 16 were used as a key card, the above specific information would relate to the particular device the key card is designed to protect, such as the room number, floor number, station number and other related information.

On the back 20 of the access card 16, shown in FIG. 3, there is provided a blank strip 50 for the signature of the card owner in order for the person receiving the card to verify the signature of the card owner. Additionally, a magnetic strip 52 is also provided on the back 20 of the access card 16 in order to verify and transmit the credit card identification number through a telephone hook-up connection. Usually, when the user of the credit card presents the card for purchasing, the vendor would place the card in a verifier which transmits the specific information either obtained from the identification number 42 on the front 18 of the card, or from the information contained in the magnetic strip 52 on the back 20 of the card, to a central verifying agency made usually by means of a telephone hook-up connection. The central agency checks the information received to verify that the number belongs to the individual whose name is imprinted on the credit card, and further checks the credit availability of the owner at that time.

Accordingly, it has been found very easy for unauthorized individuals to obtain the name of the credit card owner and his corresponding assigned credit card identification number, where this information can easily be obtained from the discarded carbon paper on any sales slip or through wrongful acts of the vendor or his agents when coming in contact with the credit card. Accordingly, the tab insert means 14 of the present invention provides additional security to avoid such unauthorized use of the access card 16.

Figure 6:
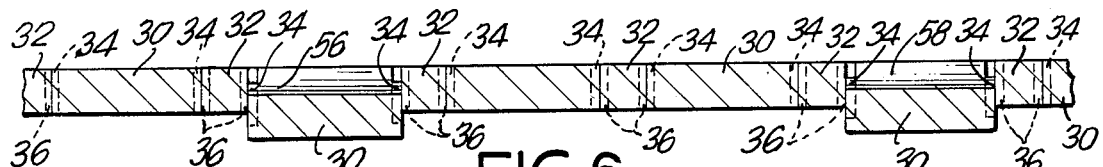
FIG. 6 is a fragmented cross sectional view taken substantially along line 6—6 of FIG. 2.
Figure 7:
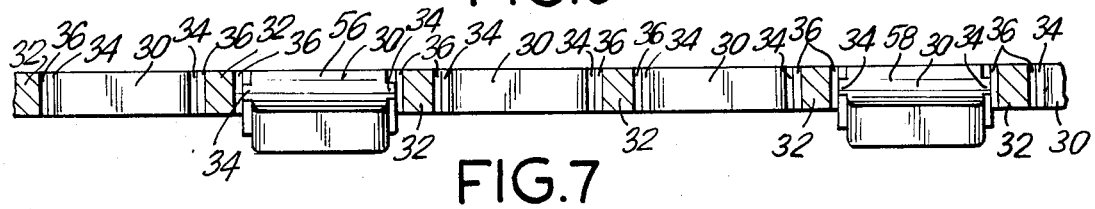
FIG. 7 is a fragmented cross sectional view taken substantially along line 7—7 of FIG. 2.

The lug members 38 of the insert tab means 14 are inserted into associated openings 26 in the recessed seat 22 on the front 18 of the card 10, as indicated in FIG. 1, and then the insert tab means 14 is pressed downwardly so that the frame member 28 rests against the recessed seat 22 with the lug members 38 extending through the openings 26, thereby providing the arrangement shown in FIG. 2. The lug members 38 are then bent, first against the recessed seat 24 on the back 20 of the card 10, and secondly bent into the opening 12 in the card 10, as indicated in FIGS. 4 and 5, to securely attach the insert tab means 14 to the card 10, thereby providing the construction shown in FIG. 3. In this arrangement, each of the tab members 30 is free to pivot at its hinge from a first position in the same or parallel plane as the frame member 28 and the partition members 32 to an inclined position relative to the plane containing the frame member 28 and the partition members 32, as indicated in FIGS. 6 and 7.

As shown in FIG. 2, different alpha numeric designations 54 are preferably provided on each of the ten tab members 30, preferably ranging from the numeral "1" on the left hand side to numeral "0" on the right hand side. Obviously, other distinguishing identifying symbols, such as letters, can also be provided in place of the alpha numeric designations. The particular symbols or designations 54 can be coplanar with the front surfaces of the tab members 30, or can be embossed into or onto the tab members 30. Accordingly, the symbols or designations can also be provided on the rear surface of each tab member 30, or if desired, can be eliminated from the front surface of each tab member 30 and only provided on the rear surface of each tab member 30. The function of the tab members 30 will now be described below.

The different positions of the tab members 30 provide a coded information for each card, depending on which of the tab members 30 are in the inclined position relative to the plane containing the frame member 28. Accordingly, each cardholder is given confidential information as to which tab members 30 should be depressed in order to pivot the selected tab members 30 into the inclined position. If the access card 16 is a credit card, when the credit card is placed in the vendor's verifier, the verifier will detect, usually by electronic means, which of the tab means 30 are in the inclined position. The verifier will then indicate to the vendor whether or not the coded information provided by the tab members 30 is proper for the particular credit card being used, where such verification can be made either by the verifier itself or through a telephone hook-up connection as set forth below.

If the access card 16 is being used as a key card, when the key card is placed in the security device, the key card having the proper tab members 30 depressed will either operate the security device, or the security device will send a signal to the hotel desk or security room to indicate whether or not the proper tab members 30 have been depressed so that a security check can be made as to whether or not an authorized person is using the key card.

For example, referring to FIGS. 2, 6 and 7, two of the tab members 30 are depressed, namely tab member 56 having numeral "5" thereon, and tab member 58 having numeral "8" thereon. As shown, the abutment members 34 of tab members 56, 58 are held in a force-fit with the abutment portions 36 of the partition members 32 so that the tab members 56, 58 are secured in the inclined position once the tab members 56, 58 are pivoted about their hinges. The remaining tab members 30 remain in their original position in the same plane as the frame member 28. Thus, the verifier or key security device will detect that tab members 56, 58 are depressed and will send out signals indicating the inclined position of tab members 56, 58. After the coded information has been recorded, and the access card 16 removed from the verifier or key security device, the tab members 56, 58 can be pushed back to their original position in the same plane as the frame member 28. If desired, the verifier can be provided with a mechanism which return the tab members 56, 58 to their original position in the same plane as the frame member 28 uoon the removal of the access card 16 from the verifier. Thus, with each cardholder having a different coded information according to the inclined positions of the tab members 30, many different combinations can be obtained to provide a high level of security for each access card.

Though the access card 16 has been shown to include the insert tab means 14 as a separate metal piece for securement to the plastic card 10 in order to provide durability to the hinges of the tab members 30 and to the abutment members 34 thereof, and also to the abutment portions 36 of the partition members 32, where it has been found that metal members will last longer and provide more reliability than plastic members, it is understood that the access card 16 could be fabricated as a one piece integral plastic card, whereby the tab members, abutment members and abutment portions would be plastic rather than metal as indicated above. It is further noted, that instead of the tab members 30 extending downwardly towards the bottom of the access card 16 as shown in FIG. 2, the insert tab means 14 could be reversed so that the tab members 30 extend upwardly towards the top of the access card 16. Furthermore, instead of the frame member 28 being disposed in the recessed seat 22 on the front 18 of the card 10, the frame member 28 could just as well be disposed on the recessed seat 24 on the back 20 of the card 10, whereby the tab members 30 would function in the same manner as set forth above.

Figure 9:
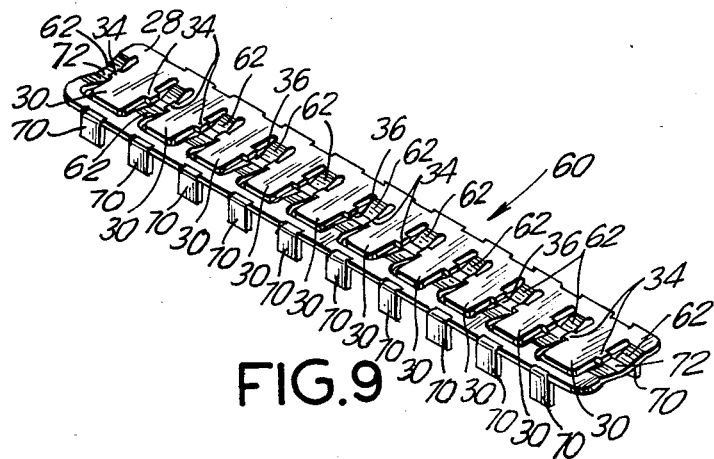
FIG. 9 is a perspective view of a modified insert tab means in accordance with the present invention.

FIG. 9 shows a modified insert tab means 60 which can also be used with the above mentioned card 10 to form an access card. The insert tab means 60 is similar to the above mentioned insert tab means 14, and includes the same frame member 28, tab members 30, tab abutment members 34 and partition abutment portions 36. Accordingly, the partition members 32 and the lug members 38 of the insert tab members 14 have been changed, as set forth below.

Figure 10:
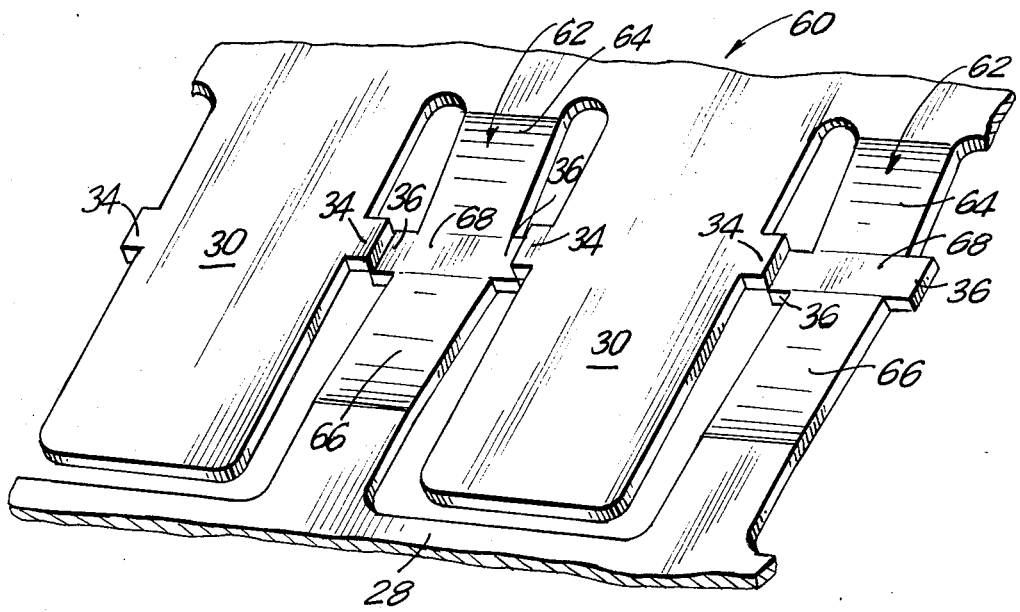
FIG. 10 is an enlarged fragmented perspective view showing the relationship between the tab members and partition members of the insert tab means of FIG. 9.

The insert tab means 60 includes partition members 62 having opposing leg portions 64, 66 which are inclined inwardly from the plane of the frame member 28 and tab members 30 to an intermediate portion 68 disposed below the tab members 30, as best shown in FIG. 10. The abutment portions 36 are disposed on opposite sides of the intermediate portion 68 for coaction with the tab abutment members 34, as will be explained below.

The insert tab means 60 also includes lug members 70 which extend perpendicularly from the longitudinal peripheral edges of the frame member 28 in the same manner as the above mentioned lug members 38. However, the lug members 70 are shorter than the lug members 38, and there are no lug members 70 on the opposing lateral edges of the end partition members 72 of the frame member 28, as set forth below.

Figure 11:
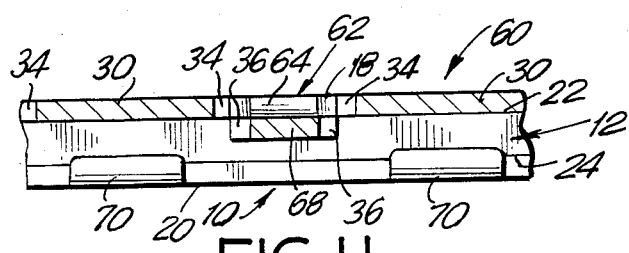
FIG. 11 is a fragmented cross sectional view showing a portion of the insert tab means of FIG. 9 secured to the card.
Figure 12:
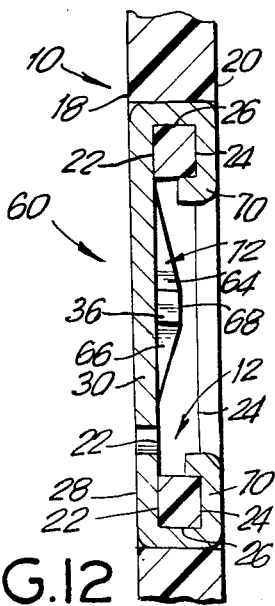
FIG. 12 is a fragmented cross sectional view also showing a portion of the insert tab means of FIG. 9 secured to the card.

Accordingly, as shown in FIGS. 11 and 12, the insert tab means 60 is inserted onto the recessed seat 22 on the front 18 of the card 10 in the same manner as the above mentioned insert tab members 14. However, due to the shortness of the lug members 70, the lug members 70 only wrap partially around the walls of the opening 12 as best shown in FIG. 12. Furthermore, due to the fact that the intermediate portion 68 of the partition member 62 is disposed within the opening 12, as shown in FIG. 11, the end partition members 72, do not rest on the recessed seat 22, but rather also extend into the opening 12 as shown in FIG. 12, which is why there are no lug members at either end of the frame member 28 of the insert tab means 60.

It is noted, that the abutment portions 36 of the partition members 62 have been disposed below the tab abutment members 34 in order to eliminate the possibility of the tab members 30 being moved out of their inclined depressed position when the access card is flexed back and forth. It is further noted, that during the cutting process of the tab members 30 to form the insert tab means 60, that a slight burr is formed on the cut edges. Accordingly, when the partition members 62 is stamped to form the intermediate portion 68, there occurs an interference-fit between the abutment portions 36 of the partition members 62 and the tab abutment members 34 due to the presence of the above mentioned burr. Accordingly, once a selected tab member is depressed, the above mentioned interference-fit will act to maintain the selected tab member 30 in the inclined position, so that flexing the access card would not cause the selected tab member 30 of the insert tab means 60 to return to its normal horizontal plane.

Figure 13:
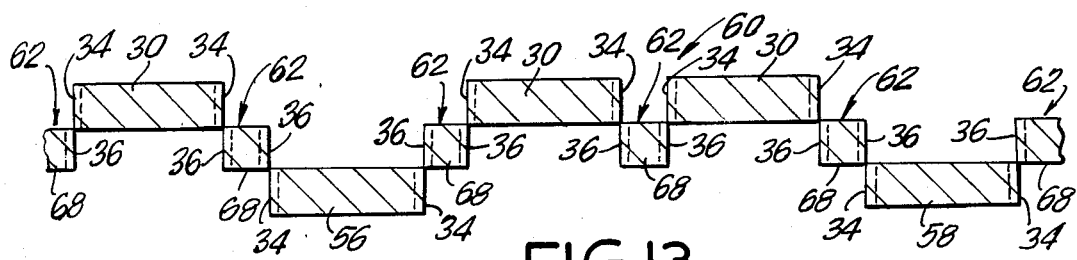
FIG. 13 is a fragmented cross sectional view showing the two positions of the tab members of the insert tab means of FIG. 9.

FIG. 13 is a view similar to FIG. 6 showing the tabs 56 and 58 depressed to their inclined position, where the remaining tab members 30 have not been depressed. It is noted, that due to the modification of the partition member 62, that the non-depressed tab members 30 are disposed above the intermediate portion 68 of the partition members 62, and that the tab members 56 and 56 are disposed below the intermediate portion 68 of the partition members 62. Accordingly, the tab members 56 and 58 of the insert tab means 60 function in the same manner as mentioned above to provide the coded information as the tab members 56 and 58 of the insert tab means 14.

Figure 14:
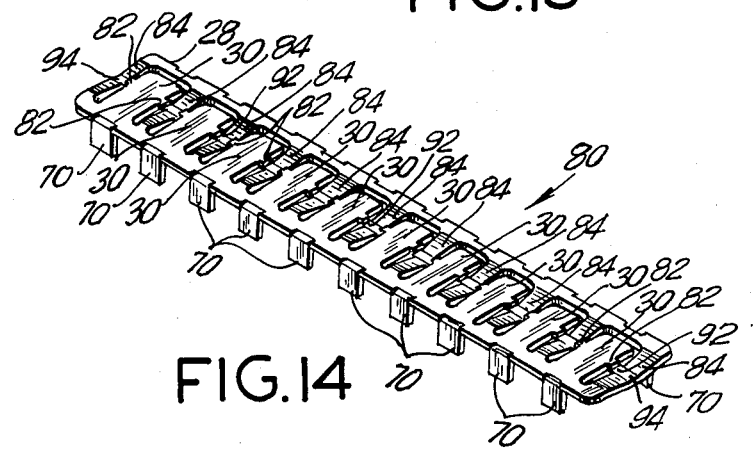
FIG. 14 is a perspective view of a further modified insert tab means in accordance with the present invention.

FIG. 14 shows a further modified insert tab means 80 which can also be used with the above mentioned card 10 to form an access card. The insert tab means 80 is similar to the above mentioned insert tab means 60 of FIG. 9, and includes the same frame member 28, tab means 30 and lug means 70. Accordingly, the position of the tab abutment means 34 and the inclination of the partition member 62, together with the position of the partition abutment portions 36, have been changed, as set forth below. It is noted, that the showing of the insert tab means 80 of FIG. 14 has been rotated 180 degrees relative to the showing of the insert tab means 14 and 60 of FIG. 1 and 9, to indicate that the tab members 30 can extend upwardly towards the top of the card 10, as set forth above.

Figure 15:
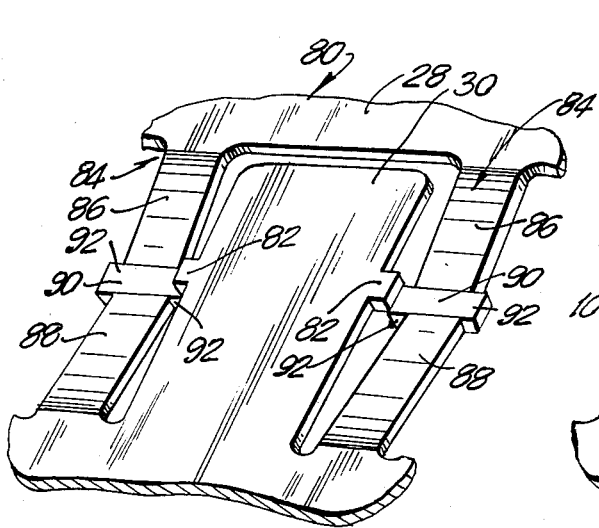
FIG. 15 is an enlarged fragmented perspective view showing the relationship between the tab members and partition members of the insert tab means of FIG. 14.
Figure 16:
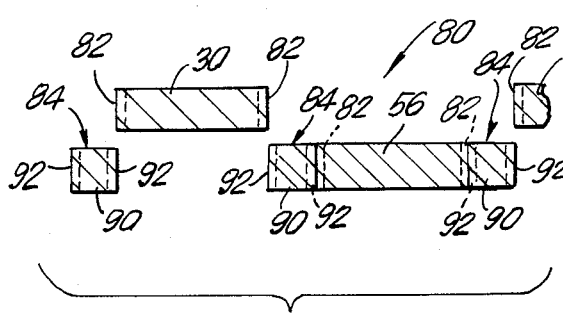
FIG. 16 is a fragmented cross sectional view showing the two positions of the tab members of the insert tab means of FIG. 14.

It is noted, that the abutment members 82 on the tab members 30 of the insert tab means 80 have been repositioned closer to the free end of the tab members 30, as best shown in FIG. 15. Furthermore, the inclination of the partition members 84 of the insert tab means 80 has been increased so that the opposing leg portions 86, 88 are inclined at a greater angle from the plane of the frame member 28 and the tab members 30 than the leg portions 64, 66 of the partition members 62 of the insert tab means 60, so that the intermediate portion 90 of the partition members 84 are spaced below the plane of the non-depressed tab members 30, as best shown in FIG. 16. Additionally, the intermediate portion 90 and the abutment portions 92 thereon are disposed in longitudinal alignment with the tab abutment members 82. It is noted, that the opposing and partition members 94 are disposed in the card 10 in the same manner as the above mentioned end partition members 72 of the insert tab means 60.

FIG. 16 is a view similar to FIG. 13 showing the tab 56 depressed to its inclined position where the remaining tab members 30 of the tab insert means 80 have not been depressed and are disposed above the intermediate portion 90 of the partition members 84. It is further noted, that due to the relative position of the tab abutment members 82 of the tab member 56 and also due to the inclination of the partition members 84, that the abutment member 82 of the tab member 56 is in longitudinal alignment and in the same plane as the abutment portion 92 of the intermediate portion 90 of the partition member 84, as shown in FIG. 16, whereby there is an interference-fit therebetween as set forth above.

Figure 17:
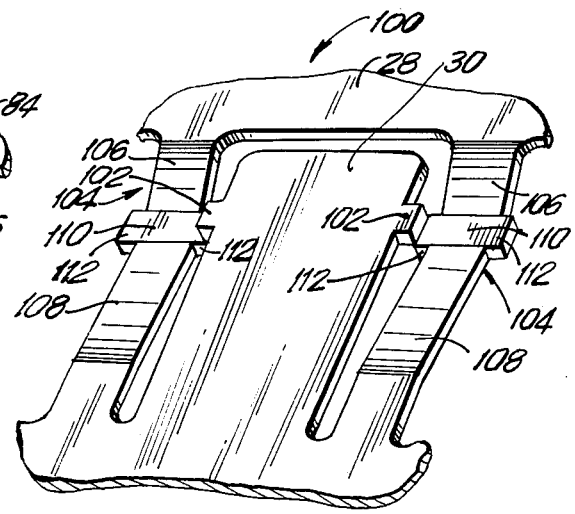
FIG. 17 is an enlarged fragmented perspective view showing the relationship between the tab members and partition members of yet a further modified insert tab means.
Figure 18:
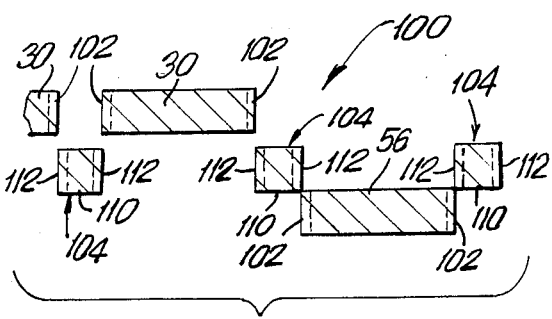
FIG. 18 is a fragmented cross sectional view showing the two positions of the tab members of the insert tab means of FIG. 17.

FIG. 17 shows a still further modified insert tab means 100, where this showing is similar to the showing of FIG. 15. In this embodiment, the abutment members 102 of each tab member 30 is moved still closer to the free end of the tab member 30 than that of the tab abutment members 82 shown in FIG. 15. Accordingly, the inclination of the partition members 104 has again been changed in order to correspond with the tab abutment members 102, where the opposing leg portions 106, 108 of the partition members 104 are again inclined from the plane of the frame member 28 and tab members 30 to provide a intermediate portion 110 disposed below the tab member 30, as best shown in FIG. 18. The abutment portions 112 disposed on opposite sides of the intermediate portion 110 are positioned in longitudinal alignment for coaction with the tab abutment members 102.

FIG. 18 is similar to FIG. 16, and shows the non-depressed tab member 30 in the same position relative to the intermediate portion 110 of the partition member 104 as that shown for the corresponding elements in FIG. 16. However, the depressed tab member 56, due to the position of the tab abutment members 102, and the inclination of the partition member 104, is now positioned below the intermediate portion 110 of the partition member 104 of the insert tab means 100, being similar to the depressed showing in FIG. 13. It is further noted, that the tab member 56 of the insert tab means 100, as shown in FIG. 18, functions in the same manner to provide the coded information as the above mentioned tab member 56 of the insert tab means 80 shown in FIG. 16.

Numerous alterations of the structure herein disclosed will suggest themselves to those skilled in the art. However, it is to be understood that the present disclosure relates to preferred embodiments of the invention which are for purpose of illustration only, and are not to be construed as a limitation of the invention.

What is claimed is:

1. An access comprising:
    a card body;
    tab means on said card body to provide coded information to avoid unauthorized use of said access card;

said tab means including a plurality of tab members, each tab member being hinged at one end to permit each tab member to be individually pivoted between a first position in a first plane and a second position in a second plane;
engagement means on said card body to maintain selected pivoted ones of said tab members in said second position to provide a particular coded information for checking authenticity of a user of said access card;
said engagement means including abutment portions for engaging said selected pivoted ones of said tab members in said second position; and
said tab members being disposed in a parallel side-by-side arrangement in said first position with opposing free ends of said tab members extending in same direction.

2. An access card as in claim 1, wherein said second plane is inclined relative to said first plane.

3. An access card comprising:
a card body;
tab means on said card body to provide coded information to avoid unauthorized use of said access card;
said tab means including a plurality of tab members, each tab member being hinged at one end to permit each tab member to be individually pivoted between a first position in a first plane and a second position in a second plane;
engagement means on said card body to maintain selected pivoted ones of said tab members in said second position to provide a particular coded information for checking authenticity of a user of said access card;
said tab members being disposed in a side-by-side arrangement;
one of a plurality of partition members being disposed between each pair of adjacent ones of said tab members; and
said engagement means being disposed between each tab member and an associated partition member.

4. An access card as in claim 3, wherein said engagement means includes abutment members disposed on opposite sides of each tab member for coaction with abutment portions disposed on opposite sides of each partition member.

5. An access card as in claim 4, wherein said partition abutment portions are disposed in said first plane.

6. An access card as in claim 4, wherein said partition abutment portions are disposed in a third plane parallel to said first plane, and said tab abutment members are in said first plane when said tab members are in said first position.

7. An access card as in claim 6, wherein said tab abutment members when in said first plane are in contact with said partition abutment portions in said third plane.

8. An access card as in claim 6, wherein said tab abutment members when in said first plane are spaced from said partition abutment portions in said third plane.

9. An access card as in claim 6, wherein leg portions of each partition member are inclined to position said partition abutment portions in said third plane.

10. An access card as in claim 9, wherein said tab abutment members are in longitudinal alignment with said partition abutment portions when said tab members thereof are in said second position.

11. An access card as in claim 9, wherein said tab abutment members are disposed in engagement below said partition abutment portions when said tab members thereof are in said second position.

12. An access card as in claim 4, wherein said tab abutment members are disposed closer to the hinged one end of each tab member.

13. An access card as in claim 4, wherein said tab abutment members are disposed closer to an opposing free end of each tab member.

14. An access card comprising:
a card body;
tab means on said card body to provide coded information to avoid unauthorized use of said access card;
said tab means including a plurality of tab members, each tab member being hinged at one end to permit each tab member to be individually pivoted between a first position in a first plane and a second position in a second plane;
engagement means on said card body to maintain selected pivoted ones of said tab members in said second position to provide a particular coded information for checking authenticity of a user of said access card;
said tab members and said engagement means being parts of an insert member; and
securement means for securing said insert member to said card body.

15. An access card as in claim 14, wherein said card body includes an opening therethrough for receiving said insert member, and said securement means includes lug members extending from said insert member for securing said insert member in said opening.

16. An access card as in claim 15, wherein said insert member includes a frame member, a recess being provided in said card body around said opening for seating said frame member.

17. An access card as in claim 1, wherein said card body includes information representing a type of credit card, and raised encoded symbols for identifying said credit card's owner.

18. An insert member for an access card comprising:
a frame member;
tab means on said frame member to provide coded information to avoid unauthorized use of an access card;
said tab means including a plurality of tab members, each tab member being hinged at one end to said frame member to permit each tab member to be individually pivoted between a first position in a first plane and a second position in a second plane;
engagement means on said frame member to maintain selected pivoted ones of said tab members in said second position to provide a particular coded information for checking authenticity of a user of an access card;
said engagement means including abutment portions for engaging said selected pivoted ones of said tab members in said second position; and
said tab members being disposed in a parallel side-by-side arrangement in said first position with opposing free ends if said tab members extending in same direction.

19. An insert member for an access card comprising:
a frame member;

tab means on said frame member to provide coded information to avoid unauthorized use of an access card;

said tab means including a plurality of tab members, each tab member being hinged at one end to said frame member to permit each tab member to be individually pivoted between a first position in a first plane and a second position in a second plane;

engagement means on said frame member to maintain selected pivoted ones of said tab members in said second position to provide a particular coded information for checking authenticity of a user of an access card;

said tab members being disposed in a side-by-side arrangement;

one of a plurality of partition members being disposed between each pair of adjacent ones of said tab members; and said engagement means being disposed between each tab member and an associated partition member.

20. An inset member as in claim 19, wherein said engagement means including abutment members disposed on opposite sides of each tab member for coaction with abutment portions disposed on opposite sides of each partition member.

21. An insert member as in claim 20, wherein said partition abutment portions are disposed in said first plane.

22. An insert member as in claim 20, wherein leg portions of each partition member are inclined to position said partition abutment portions in a third plane parallel to said first plane, and said tab abutment members are in said first plane when said tab members are in said first position.

23. An insert member for an access card comprising:

a frame member;

tab means on said frame member to provide coded information to avoid unauthorized use of an access card;

said tab means including a plurality of tab members, each tab member being hinged at one end to said frame member to permit each tab member to be individually pivoted between a first position in a first plane and a second position in a second plane;

engagement means on said frame member to maintain selected pivoted ones of said tab members in said second position to provide a particular coded information for checking authenticity of a user of an access card; and said frame member including securement means for securing said insert member to an access card.

24. An insert member as in claim 23, wherein said securement means includes lug members extending from said frame member.

* * * * *